United States Patent
Lopez, Jr.

(10) Patent No.: US 7,149,709 B1
(45) Date of Patent: Dec. 12, 2006

(54) INTERNET BASED PRINT ORDER SYSTEM

(76) Inventor: Leonard H. Lopez, Jr., 7354 Canterfield, San Antonio, TX (US) 78240

( * ) Notice: Subject to any disclaimer, the term of this patent is extended or adjusted under 35 U.S.C. 154(b) by 0 days.

(21) Appl. No.: 09/487,387

(22) Filed: Jan. 18, 2000

(51) Int. Cl.
*G06Q 30/00* (2006.01)

(52) U.S. Cl. .......................................... 705/26; 705/37

(58) Field of Classification Search ................ 705/26, 705/27, 1
See application file for complete search history.

(56) References Cited

U.S. PATENT DOCUMENTS

| | | | |
|---|---|---|---|
| 5,276,788 A | 1/1994 | Stapleton | |
| 5,303,342 A | 4/1994 | Edge | |
| 5,327,265 A | 7/1994 | McDonald | |
| 5,890,175 A | 3/1999 | Wong et al. | |
| 5,964,156 A * | 10/1999 | Smith et al. | 101/471 |
| 6,134,568 A | 10/2000 | Tonkin | |
| 6,330,542 B1 * | 12/2001 | Sevcik et al. | 705/8 |
| 6,347,256 B1 | 2/2002 | Smirnov et al. | |
| 6,535,294 B1 * | 3/2003 | Arledge et al. | 358/1.15 |
| 6,791,707 B1 * | 9/2004 | Laverty et al. | 358/1.15 |

FOREIGN PATENT DOCUMENTS

| | | |
|---|---|---|
| EP | 0 814 425 A2 | 12/1997 |
| EP | 0 814 425 A3 | 12/1997 |
| WO | WO 98/04988 | 2/1998 |
| WO | WO 98/10356 | 3/1998 |
| WO | WO 99/63452 | 9/1999 |
| WO | WO 00/26810 | 5/2000 |
| WO | WO 00/26811 | 5/2000 |

OTHER PUBLICATIONS

Roth et. al, Publishing Face-Off, Feb. 1996, v.13, n.2, p. 124, Macworld. Accessed Jun. 4, 2002 from DialogWeb, accession No. 01899559.*
Simone, Changing of the Guard, Feb. 9, 1993, PC Magazine, v. 12, n. 3, p. 23. Accessed Jun. 4, 2002 from DialogWeb accession No. 03863063.*
Dyson, Xtensions to Quark Xpress, Seybold Report on Desktop Publishing, Jun. 8, 1992, v. 6, n. 10, p. 3. Accessed Jun. 4, 2002 from DialogWeb, accession No. 01520910.*
ImageX.com SEC filing of May 12, 1999, downloaded from the Internet on Oct. 15, 2004.*
Ofer LaOr, CGI Programming with Visual Basic 5, Mc-Graw-Hill, 1998, at least pp. 191, 202-209, from Chapter 7, Advanced HTML and Additional Server Side Constructs/Server-Side, 6 pages.*
Screen printouts, Seybold Conference, Boston 1999. Downloaded from the Internet Oct. 25, 2004, 6 pages.*
Eric Bean, The Business Printing Industry, presented on Mar. 1, 1999 at the Seybold Conference, Boston/1999, downloaded from the Internet on Mar. 25, 2005, 20 pages.*

(Continued)

*Primary Examiner*—Jaime Zurita

(57) ABSTRACT

An automated print order system for institutional business cards and stationery products generally comprises a requestor interface for entry of a distributed user's print order and a processor interface for fulfillment of the user's print order. The requestor interface is adapted to enable the user to select a company tailored product according to a predeterminable profile and the processor interface is adapted to directly generate a pre-press product automatically incorporating the predeterminable profile into the tailored product. The pre-press product of the preferred embodiment of the present invention comprises a direct-to-plate command set or a printing plate generated therefrom.

17 Claims, 20 Drawing Sheets

OTHER PUBLICATIONS

World Wide Web location http://www.imagex.com (date unknown).
World Wide Web location http://www.impresse.com (date unknown).
World Wide Web location http://www.printonthenet.com (date unknown).
U.S. Appl. No. 09/487,392, filed Jan. 18, 2000.

* cited by examiner

Create Your Profile /73

Stationary Information

Name* 75

Title* 79 — 81

Address* 80 — 82

Telephone 76

General Information

Billing Code 77

Supervisor 78

Contact Phone

Username*

Save Profile

*Figure 7*

Order Status
Username: Doe4321

| Order # | Status | Product | Type | Qty | Ordered | Ship |
|---|---|---|---|---|---|---|
| 1498 | Awaiting Purchaser Approval | Letterhead | Service Center | 3 | 01/01/2000 | Ground |
| 1495 | Awaiting Purchaser Approval | Envelopes | Regular #10 | 1 | 01/01/2000 | Over Night |
| 1473 | Awaiting Shipping | Letterhead | Corporate | 1 | 12/15/1999 | Ground |

*Figure 9*

Create Service Center Profile

Stationery Information ← 104

Center Name*

Center Number*

Address Line 1*
105

Address Line 2*

Billing Code*
106

Contact Name

Contact Phone

Stationery Logo*
107

Save Profile

INTERNET BASED PRINT ORDER SYSTEM

FIELD OF THE INVENTION

The present invention relates to the expedited production of print media. More particularly, the invention relates to an internet based print order system specifically adapted for use in efficiently and cost-effectively supplying business cards, stationery products and the like to institutional and conglomerate users.

BACKGROUND OF THE INVENTION

Charges for business cards, stationery products and the like constitute a significant portion of any commercial enterprise's cost of doing business. Due, in general, to the labor intensive nature of type-setting and, in particular, to the necessity to specifically tailor each product to a particular user's identity and/or office location, the actual printing costs associated with these items have traditionally far exceeded the costs associated with other print media. In addition, while smaller entities are more readily able to incorporate card and stationery ordering functions into other job functions, large institutional and conglomerate users often find that a significant number of personnel must be dedicated solely to the functions of order preparation, approval, submission, proofing, receiving, quality assurance and distribution. To further exacerbate the problem, each of these functions tends to be labor-intensive, each giving rise to the possibility for error, the only recourse being to reinitiate the entire process. Although such institutional and conglomerate users as are most affected by these problems have traditionally been expedient in rooting out similar problems in other areas of their businesses, they without exception tolerate these issues due to the generally accepted perception that no better system exists.

From the printer's perspective, the processes involved in receiving an order, typesetting a business card or stationery product and corresponding with the client to proof the order are typically more involved, and consequently often more costly, than the actual printing of the order. To further the frustration felt by the printer, the proofing process is ripe for dispute with the client, leading too often to the difficult decision as to whether to reprint an order free of charge or risk loss of the client by billing on a disputed order. What is more, even if the printer decides to discuss such an issue with its client, the regional printer must then at minimum absorb the long distance telephone charges involved in addition to those telecommunication charges already necessitated in faxing proofs and other related order documentation. Like the institutional and conglomerate users they serve, however, printers have consistently failed to address these issues, without exception accepting the present system as simply the best available.

Clearly, there is long-standing need for an improved print order system that eliminates these widely varied but unnecessarily cost-increasing functions. As a result, it is a primary object of the present invention to introduce an entirely new concept in business card and stationery ordering and printing for use by large institutional and conglomerate clients as well as the printers that serve their respective needs. In implementation of this concept, it is a further object of the present invention to provide an internet based print order system that minimizes data entry at the user site, streamlines the order approval process, eliminates the necessity for individual order proofing and eliminates data entry at the printer location. It is a still further object of the present invention to provide such as system that makes order status information automatically available for the user and incorporates the printer's billing functions directly into the order process. Likewise, it is a still further object of the present invention to facilitate drop-shipment of finished products by eliminating the need for user-side quality assurance and enabling orders to be processed according to destination address. Finally, it is an overriding object of the present invention to increase customer satisfaction by providing consistently accurate, fully company tailored business card and stationery products on a greatly reduced order processing timeline without sacrifice of control by the purchasing agent or of quality in the finished product.

SUMMARY OF THE INVENTION

In accordance with the foregoing objects, the present invention—an automated print order system for institutional business cards and stationery products—generally comprises a requester interface for entry of a distributed user's print order and a processor interface for fulfillment of the user's print order. In the preferred embodiment of the present invention, the requestor interface is adapted to enable the user to select a company tailored product according to a predeterminable profile and the processor interface is adapted to directly generate a pre-press product automatically incorporating the predeterminable profile into the tailored product. Although, in light of the exemplary embodiment set forth herein, those of ordinary skill in the art will recognize many substantial equivalents, the pre-press product of the preferred embodiment of the present invention comprises a direct-to-plate command set or a printing plate generated therefrom. As one alternative, however, it is noted that many objects of the present invention may be equally appreciated in an implementation wherein the pre-press product comprises a high-speed copier command set or the like.

Also in accordance with the preferred embodiment of the present invention, the predeterminable profile comprises user-indicative information, such as name and address, appropriate telephone and facsimile numbers, e-mail and/or web page information as well as billing codes and contact information for processing of the print order. As will be apparent further herein, however, it may also be advantageous to implement a plurality of predeterminable profiles, wherein one or more may also be dedicated to storage of similar company-indicative information. In any case, the requester interface allows the user to selectively order a company tailored business card or stationery product, which, as will be better understood further herein, will automatically incorporate the appropriate elements of the predeterminable profile or profiles.

The automated print order system of the preferred embodiment further comprises a purchaser interface for validating the user's print order. To effect this function, the purchaser interface is adapted to selectively authorize generation of the pre-press product and, to maximize purchasing agent control, enables the purchaser to modify the predeterminable profiles and/or modify or delete the user's print order.

In the preferred embodiment of the present invention, the automated print order system resides on a server site with connectivity to the World Wide Web, which hosts the requester interface, the processor interface and the purchaser interface. In this manner, the requestor interface and the purchaser interface are accessible from any operable node on the World Wide Web. To maximize user-to-server communication efficiency as well as to provide for system security, the requestor interface further comprises a server-side scripting implementation.

Finally, the processor interface also comprises a batch function adapted to control pre-press product generation. The automated print order system is adapted to store the user's order in an order data table having elements adapted to reference each predeterminable profile as required and the batch function is adapted to import information from these profiles into a batch table according to the references. As a result, a completed batch table comprises a complete specification for the ordered tailored product, which may comprises any company authorized variation of letterhead, business cards, envelopes, writing pads, address cards, mailing labels or the like. Finally, the batch function is also adapted to format the batch table specification for the desired tailored product into a pre-press product compatible specification.

Finally, many other features, objects and advantages of the present invention will be apparent to those of ordinary skill in the relevant arts, especially in light of the foregoing discussions and the following drawings, exemplary detailed description and appended claims.

BRIEF DESCRIPTION OF THE DRAWINGS

Although the scope of the present invention is much broader than any particular embodiment, a detailed description of the preferred embodiment follows together with illustrative figures, wherein like reference numerals refer to like components, and wherein:

FIG. 7 shows, in a computer screen representation, certain details of the profile creation step of the product request entry function as detailed in FIG. 6;

FIG. 9 shows, in a computer screen representation, certain details of the order review step of the product request entry function as detailed in FIG. 6;

FIG. 13 shows, in a computer screen representation, certain details of the service center profile creation sub-step of the title or profile maintenance step as detailed in FIG. 12;

DETAILED DESCRIPTION OF THE PREFERRED EMBODIMENT

Although those of ordinary skill in the art will readily recognize many alternative embodiments, especially in light of the illustrations provided herein, this detailed description is exemplary of the preferred embodiment of the present invention, the scope of which is limited only by the claims appended hereto.

Figure 1:
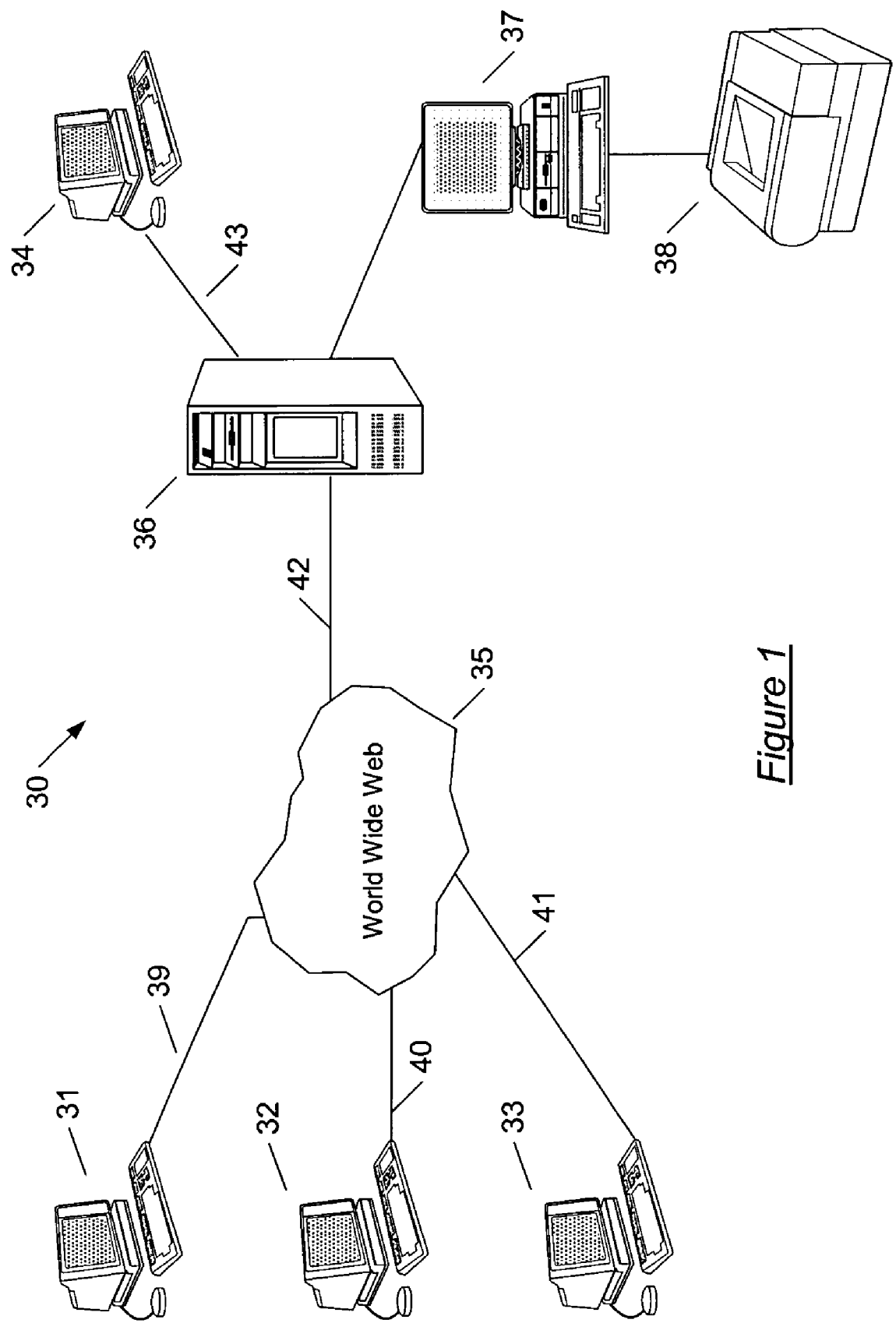
FIG. 1 shows, in functional block diagram, the internet based print order system of the present invention as implemented according to the presently preferred embodiment.

Referring now to FIG. 1 in particular, the Internet based print order system 30 of the present invention is shown to generally comprise one or more requestor interfaces 31, 32, a purchaser interface 33 and a processor interface 34, each resident upon the World Wide Web 35 through a host server 36. As also shown in FIG. 1, the print order system 30 of the present invention further comprises an interface 37 from the server 36 to an automated pre-press system 38 such as, for example, a direct-to-plate system. In operation, individual users and/or local office representatives access the server 36 through their respective ordinary Internet gateways 39, 40 in order to update user information and/or to place print orders. As will be better understood further herein, the updated information and/or print orders are then immediately accessible to a company purchasing representative, through the representative's ordinary Internet gateway 41, for order modification, deletion or approval. Likewise, approved print orders are then immediately accessible to the printer, through the printer's ordinary Internet gateway 42 or by direct access 43 to the server 36, as shown in FIG. 1, for any necessary processing prior to pre-press. Finally, approved and processed orders are directly flowed to the pre-press system 38, wherein a fully tailored print plate, or the substantial equivalent, is automatically produced to predetermined customer specifications.

Figure 2:
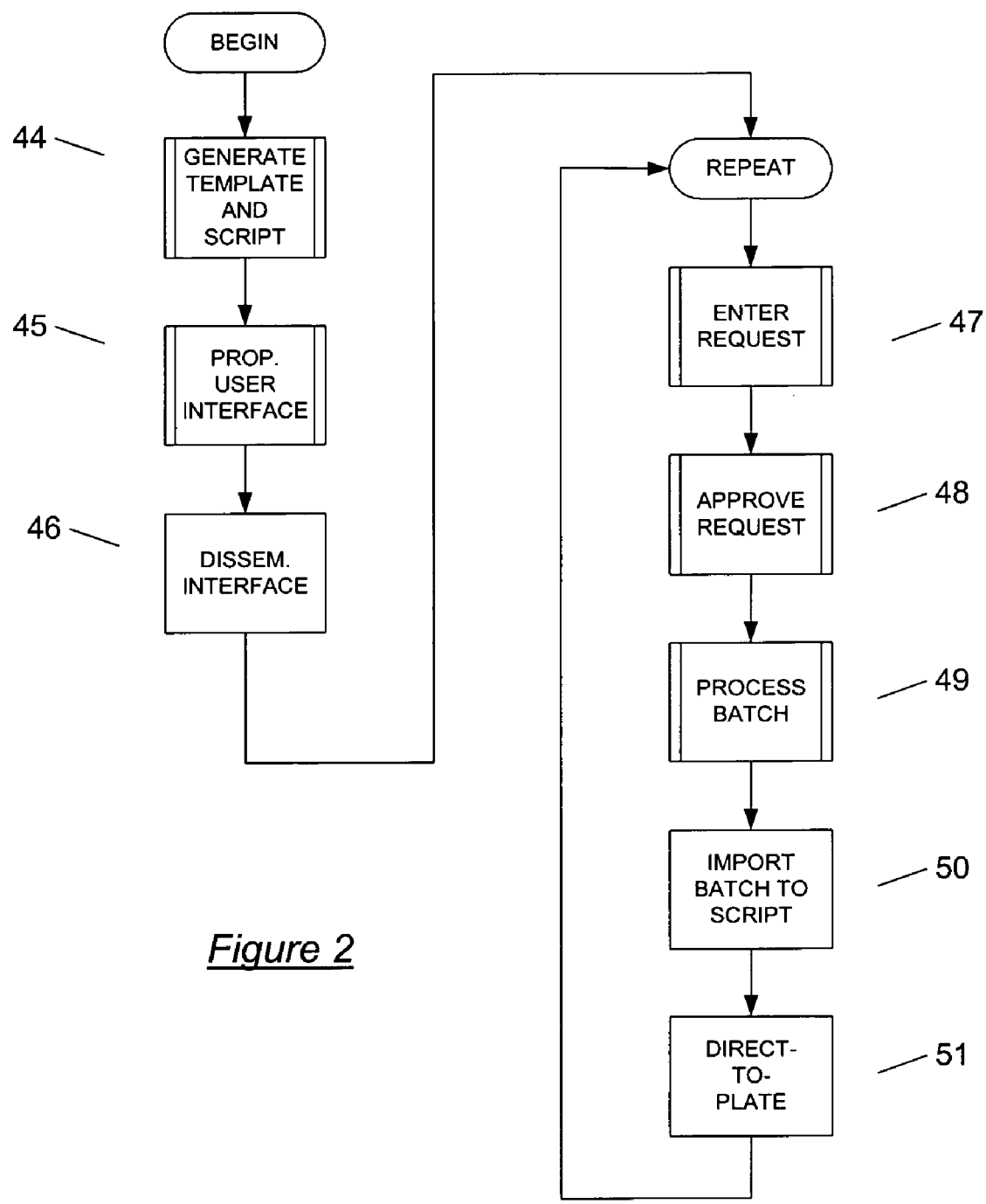
FIG. 2 shows, in flowchart, the top-level functions of the internet based print order system of FIG. 1.

As particularly shown in FIG. 2, the print order system 30 of the preferred embodiment of the present invention is generally implemented by generating per-product electronic publishing templates and a script program for automatically flowing order data thereto 44. As will be better understood further herein, the template and script program generation step 44 is also relied upon to generate a company specific field list, which is then used to construct a database management system 74, for collection and storage of user and print order information, and to propagate the requester, purchaser and processor interfaces thereto 45. Because the print order system 30 of the preferred embodiment of the present invention is designed for Internet implementation, the user interfaces are disseminated simply by e-mail message or like communication of the URL addresses corresponding to the interfaces' location on the World Wide Web 46.

Once the database management system and the requester, purchaser and processor interfaces thereto are established on the host server, business card and stationery print orders may be repetitively fulfilled through an efficient process of simplified order entry 47 and approval 48 followed by batch processing 49 and scripting 50 for the automated and accurate generation of print plates 51. As will be better understood further herein, the order entry step 47 generally comprises the single entry of user specific information followed by the repeated mere selection, from a full range of available products, of desired print products. As will be appreciated by those of ordinary skill in the art, this architecture dramatically reduces errors in order fulfillment by virtually eliminating the typesetting function. As also detailed further herein, the order approval process 48 is greatly streamlined by enabling the company's purchasing agent to rely upon the unchanged status of previously checked user entered information as well as his or her confidence in the automated fulfillment of an approved order. Finally, no typesetting and no proofing is required of the printer as the approved order information is directly and automatically flowed into the pre-press product 51.

Figure 3:
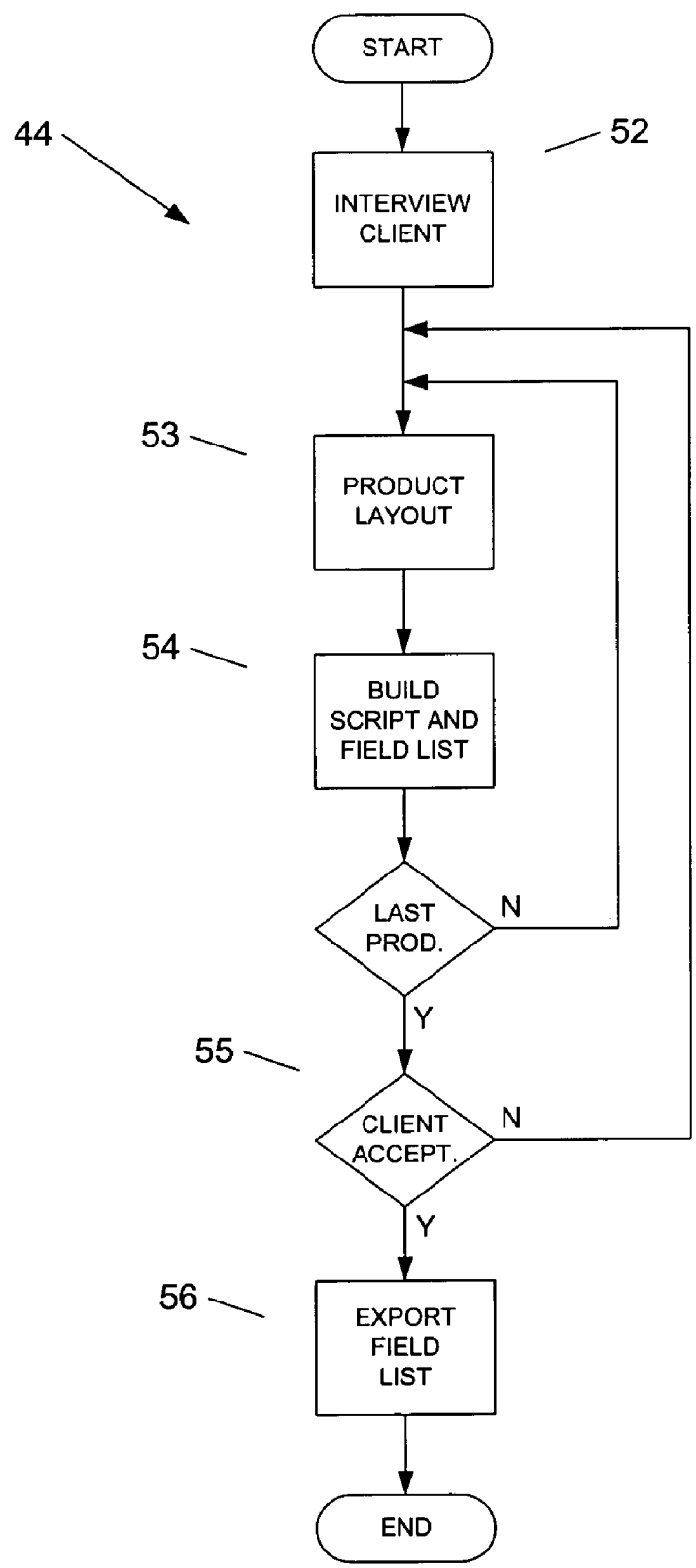
FIG. 3 shows, in flowchart, certain details of the template and script generation function of FIG. 2.

Referring now to FIG. 3, the template and script program generation function 44 is detailed. As a preliminary step, a printer representative will typically conduct an in-depth interview with the company client to determine the company's full range of business card and stationery needs 52. This interview will also determine the circumstances dictating when the various options are to be made available to each level of personnel. Samples of presently utilized business card and stationery products may also be collected at this time in order to ensure maximum product continuity upon implementation of the system. The printer's electronic publishing staff then generates a prototypical product record for each product to be made available through the system 53. This record, or template, comprises the complete typography of each product, including all tracking, kerning, text adjustment, graphics placement and like information. As will be better understood further herein, the prototypical records should be generated in a software directly compatible with the pre-press product to be used in fulfillment of the customer's print orders—in the preferred embodiment, a direct-to-plate platemaking system such as the well-known DPX system commercially available from Purup-Eskofot of Denmark. Although those of ordinary skill in the art will recognize many substantial equivalents, especially in light of this exemplary description, Applicant has found that the trademark "QUARK XPRESS" electronic publishing application, commercially available from Quark, Inc. of Denver, Colo., is one such suitable software.

As each possible product configuration is captured in a prototypical product record, a script program and field list is generated 54 as what will become an automated interface with a database management system 74, detailed further herein. This list essentially defines the fields for the database tables, each field representing a unique element of the various products' specification. For example, and in every case depending upon product layouts, one or more fields may be dedicated for the individual user's name, a field may be dedicated for the user's direct telephone line, a field may be dedicated for the user's e-mail address and so forth. As will be better understood further herein, user peculiar information of this nature is referred to as user-indicative information and the fields that contain such information will be utilized to create one or more predeterminable profiles in the database creation steps, detailed further herein. Likewise, one or more fields may be dedicated for company-indicative information such as, for example, the address of a particular local office or the list of authorized, standard titles for various personnel.

Although those of ordinary skill in the art will recognize that the data from a database created according to these fields could be flowed directly to the electronic publishing application for merger with the prototypical product records, it is preferred that a script program be generated 54 to handle formatting and graphics importation as an intermediate, albeit fully automated, process. The provision of such a script program ensures that the business cards and/or stationery products will invariably be produced according to company specification regardless of font type or size, and the like, utilized in filling the database tables. In the preferred embodiment of the present invention, Applicant has implemented such a script program with the trademark "XDATA" extension to the Quark product, commercially available from Em Software, Inc. of Steubenville, Ohio. Although those of ordinary skill in the art will recognize many substantial equivalents, the "XDATA" product is widely compatible with many standard database and spreadsheet applications and is specifically adapted for compatibility with the implemented trademark "QUARK XPRESS" application.

Figure 4:
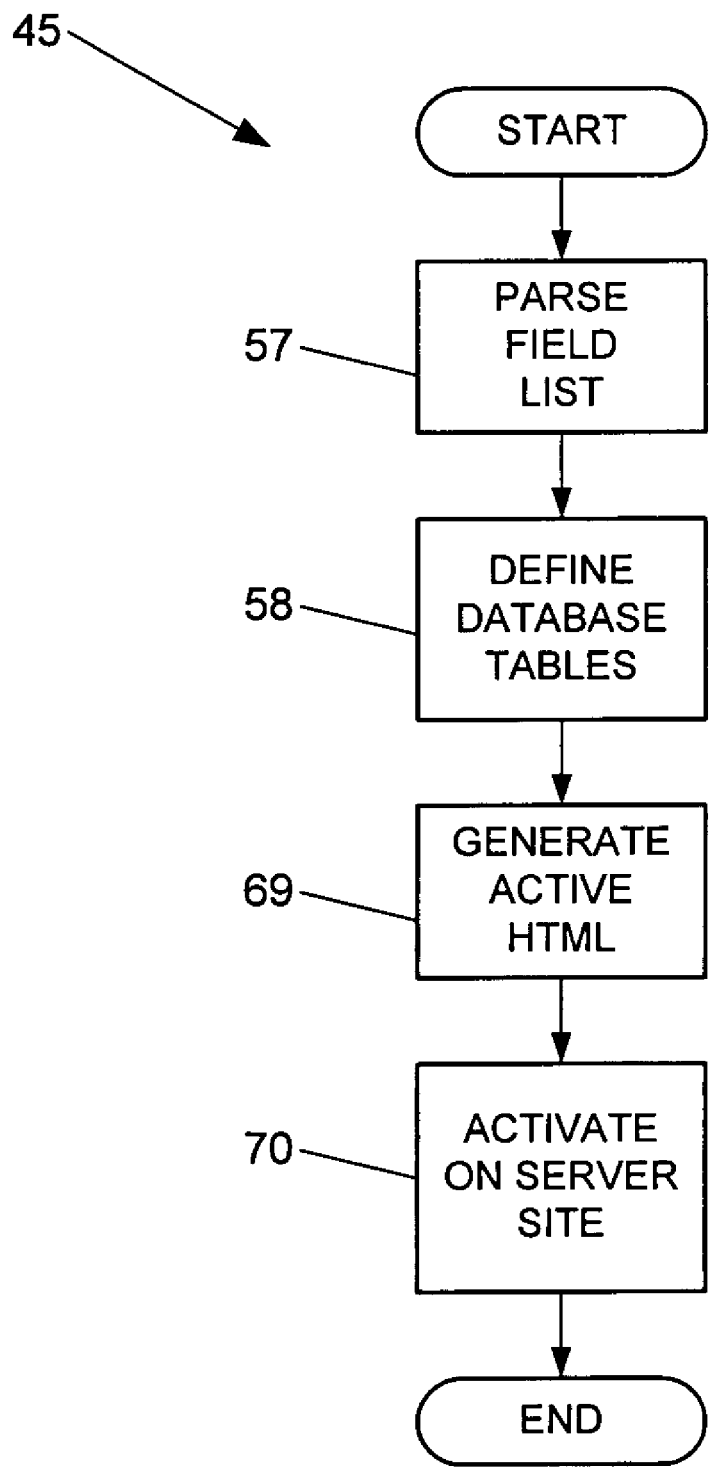
FIG. 4 shows, in flowchart, certain details of the user interface propagation function of FIG. 2.

Once a template has been produced for each product to be made available through the system and the fields necessary for completion thereof have been identified, demonstrative data may be flowed to the electronic publishing package to actually generate a print plate for quality assurance purposes 55. As will be better understood further herein, this is the only instance of proofing required according to the method of the present invention. If the product is correct at this juncture, the product will be correct in all cases save an error in filling the database. As also be better understood further herein, however, the print order system of the present invention is also specifically adapted to root out any such database error. Assuming then client acceptance of the products produced according to the generated templates and scripting program, the field list is exported for database implementation 56, as detailed in FIG. 4.

Figure 5:
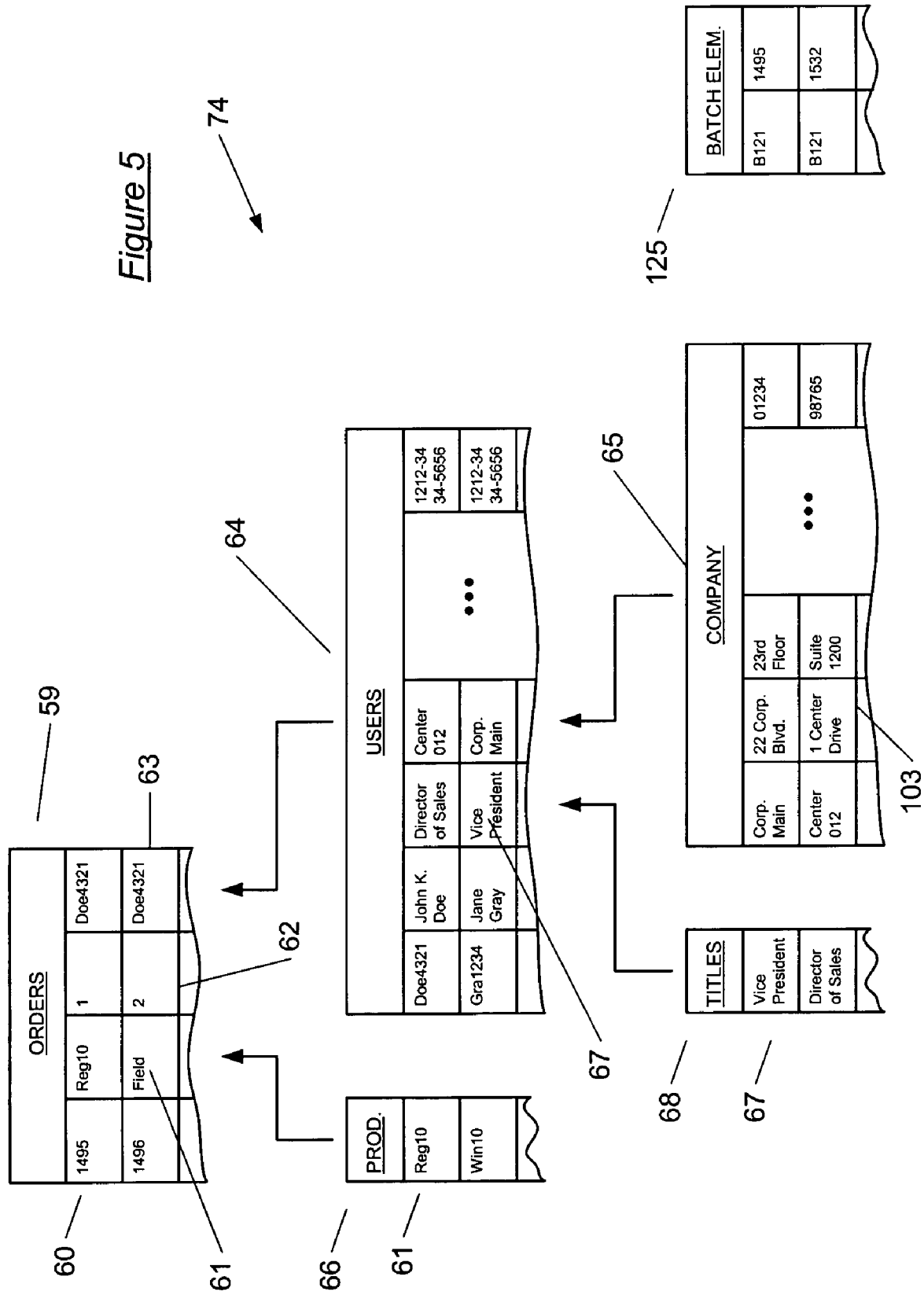
FIG. 5 shows, in schematic block diagram, certain details of the database structure of the internet based print order system of FIG. 1 as referred to in FIG. 4 and elsewhere.

As an initial step, the fields are parsed according to the type of information to be collected and held therein and, as will be better understood further herein, the circumstances under which that type of information may change over the implementation life of the print order system 57. Each category is then implemented in the database 74 as a separate, cross-linkable table 58. For example, as shown in the exemplary representation of FIG. 5, the "orders" table 59 may only contain an order number 60, product identifier 61, quantity 62 and user identifier 63. While the product identifier 61 and quantity information 62 are directly stored in the "orders" table 59, it is noted that the user information is actually only a cross-link to the "users" table 64. In this manner, as will be better understood further herein, an update to a user's information may be effective at the last possible moment prior to actual product printing. Likewise, company-indicative information is cross-linked from the "company" table 65 to ensure that a single update can be made effective on a date certain within all outstanding orders. As also shown in FIG. 5, product identifiers 61, stored in the "products" table 66 and authorized titles 67, stored in the "titles" table 68, are flowed into the various other tables as selectable only inputs. In this manner, only those products for which a prototypical record have been developed and only those titles authorized by the company can be selected by a user requestor.

Once the database tables are defined 58, according to the foregoing considerations, HTML interfaces are generated for database manipulation and maintenance 69. The system is then activated on the host server 70. In the preferred embodiment of the present invention, the HTML interfaces are implemented using a server-side scripting language, such as the trademark "ACTIVE SERVER PAGES," commercially available from the Microsoft Corporation of Redmond, Wash. In this manner, communications with the server from a user's browser are made extremely efficient, ultimately resulting in increased customer satisfaction. As is well-known to those of ordinary skill in the art, such an implementation also enables the provision of effective security protocols. In any case, as shown in FIGS. 6 through 19, the implemented database interfaces 31,32,33,34 of the present invention enable efficient order entry and approval and streamlined order fulfillment and exemplary features of the preferred embodiment are now detailed.

Figure 6:
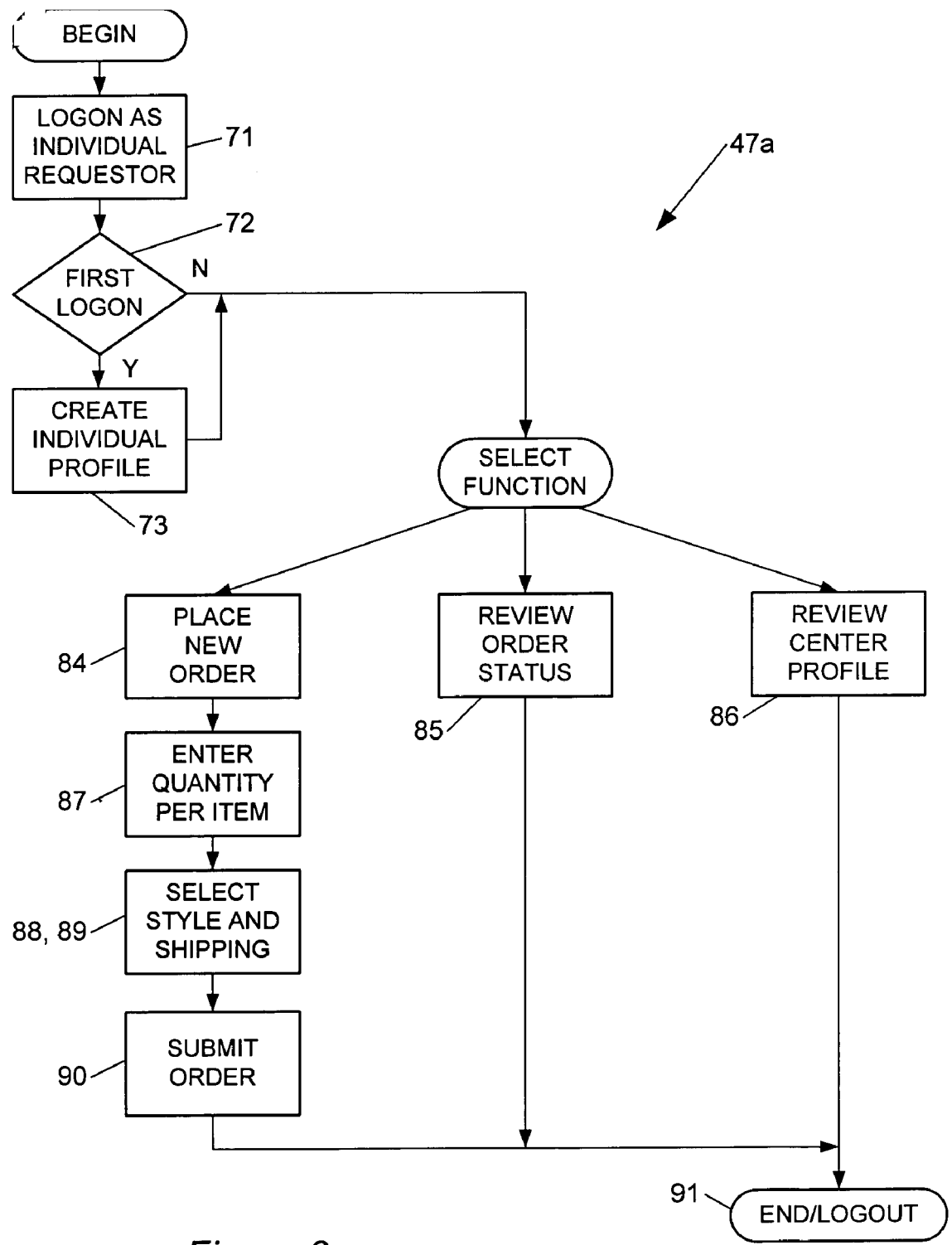
FIG. 6 shows, in flowchart, certain details, from an individual requestor's perspective, of the product request entry function of FIG. 2.
Figure 8:
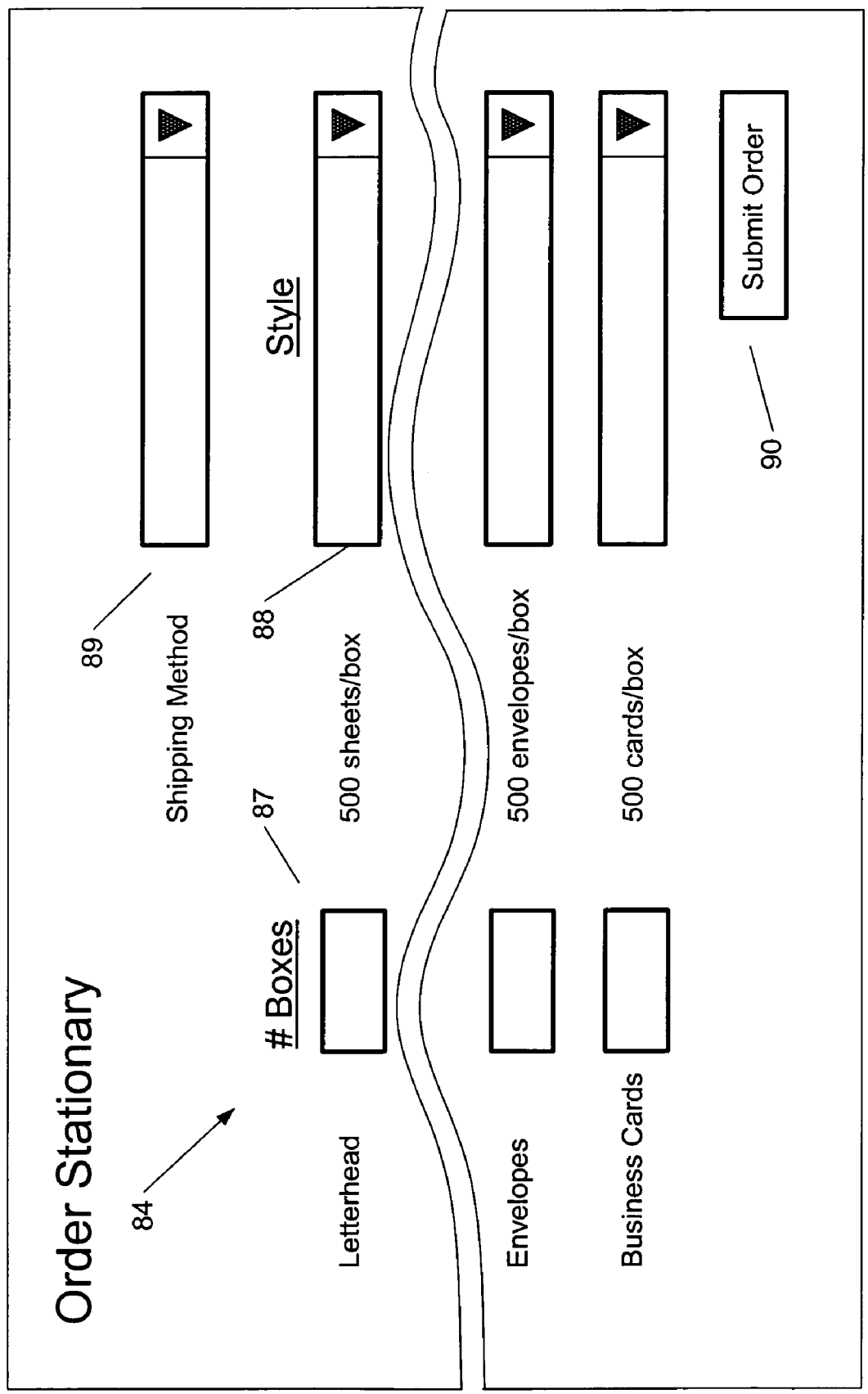
FIG. 8 shows, in a computer screen representation, certain details of the order placement steps of the product request entry function as detailed in FIG. 6.

Referring now to FIG. 6, many of the functions available to the individual user print product requestor 47a are detailed. As shown in the Figure, a security protocol is implemented 71 to identify the individual user and, if the user has not previously utilized the system 72, he or she will be invited to create an individual profile 73. This profile, which will store all user-indicative information necessary to produce any available business card or stationery product, is then stored on the server 36 in the database management system 74. As shown in FIG. 7, such a profile 73 may include personal information such as the individual's name 75 and telephone number 76, and may also include, at the company's discretion, such information as a billing code 77 and/or supervisor name 78. It is noted that information such as the user's title 79 and address 80 are selected from drop-down menus 81, 82, thereby ensuring company control of authorized titles and address format, as will be better understood further herein. Finally, upon saving of the profile 73, a "last updated" date 83 is noted for communication to the company purchasing agent. In this manner, the company purchasing agent need only verify user input data upon change of that date.

Referring again to FIG. 6, it is noted that the individual user then has the options to place a new order 84, review the status of a pending order 85 or to update his or her profile 86, as necessary. As also shown in the exemplary order screen of FIG. 8, the user places a new order by simply entering the desired quantity per product 87 on the order form and then selecting the style 88 and shipping method 89. In this manner, the likelihood for error in the ordering process is virtually eliminated. The submit order button 90 is then simply clicked, reducing the entire business card and stationery product order process to an easy, error-free few seconds. The user may then be automatically logged out of the requestor interface 91.

In the alternative, the user having already placed an order may desire to known the status of that order. In this case, the user is directed to an order status screen 85, such as the exemplary screen represented in FIG. 9, where the precise status of the order is made available without necessity for any human resources. As shown in the representation, the user can tell whether the company purchasing agent has approved the order 92 as well as whether the agent has changed any portion, such as quantity 87 or shipping method 89, of the order. Likewise, if there is any delay in the order fulfillment process, the user will also have accurate information as to whether the delay is a printer problem or a delay in the approval process.

Figure 10:
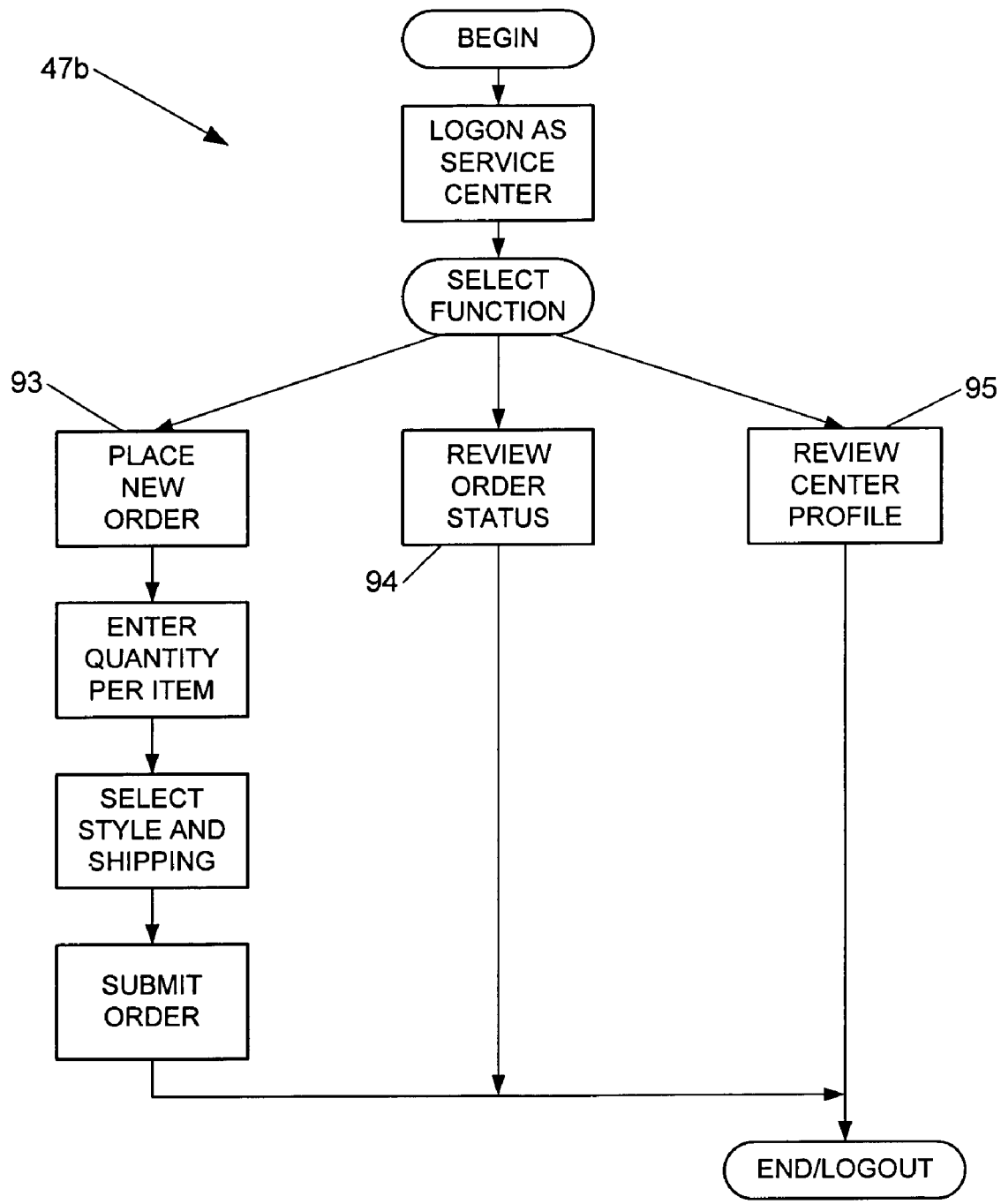
FIG. 10 shows, in flowchart, certain details, from a local office representative requestor's perspective, of the product request entry function of FIG. 2.

As shown in FIG. 10, the local office or service center representative is provided with similar functionality for ordering 47b general stationery or business card products. Although the order placement process 93 and status review functions 94 are virtually identical to those made available to the individual user, and the representative may view the local office profile 95, it is noted that the local office representative does not have the ability to modify the office profile. In this manner, print orders are not disrupted by miscommunication and/or disagreement among remote personnel.

Figure 11:
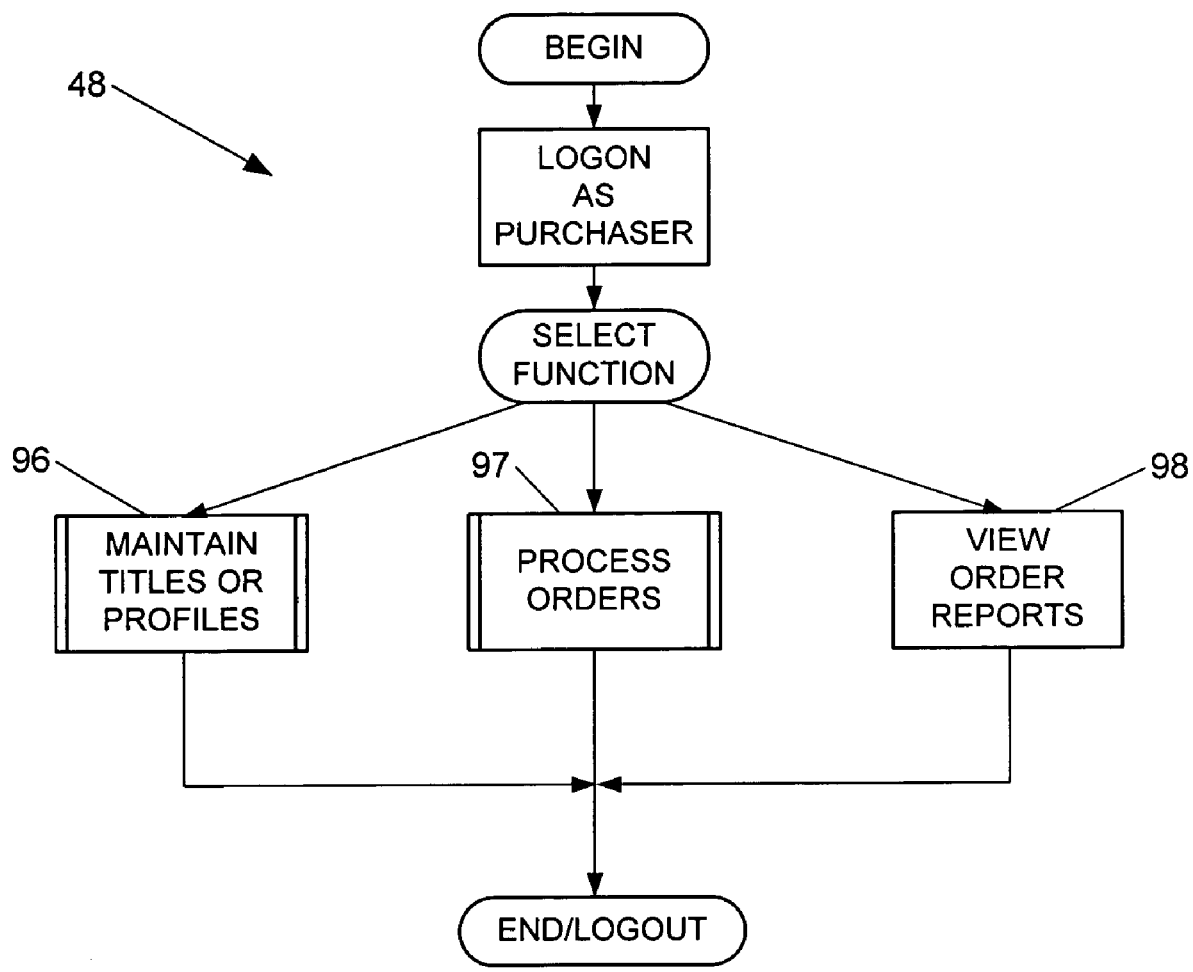
FIG. 11 shows, in flowchart, certain details of the request approval function of FIG. 2.

Turning now to FIG. 11, the company purchasing agent is provided with a purchaser interface 33 through which he or she is able to maintain the local office profiles and/or or the list of authorized personnel titles 96. The purchasing agent is also provided with functionality enabling the expedited modification, deletion and/or approval or individual and service center orders 97 and can at any time view a report indicating the status of all orders in the system 98, from entry through shipment and billing.

Figure 12:
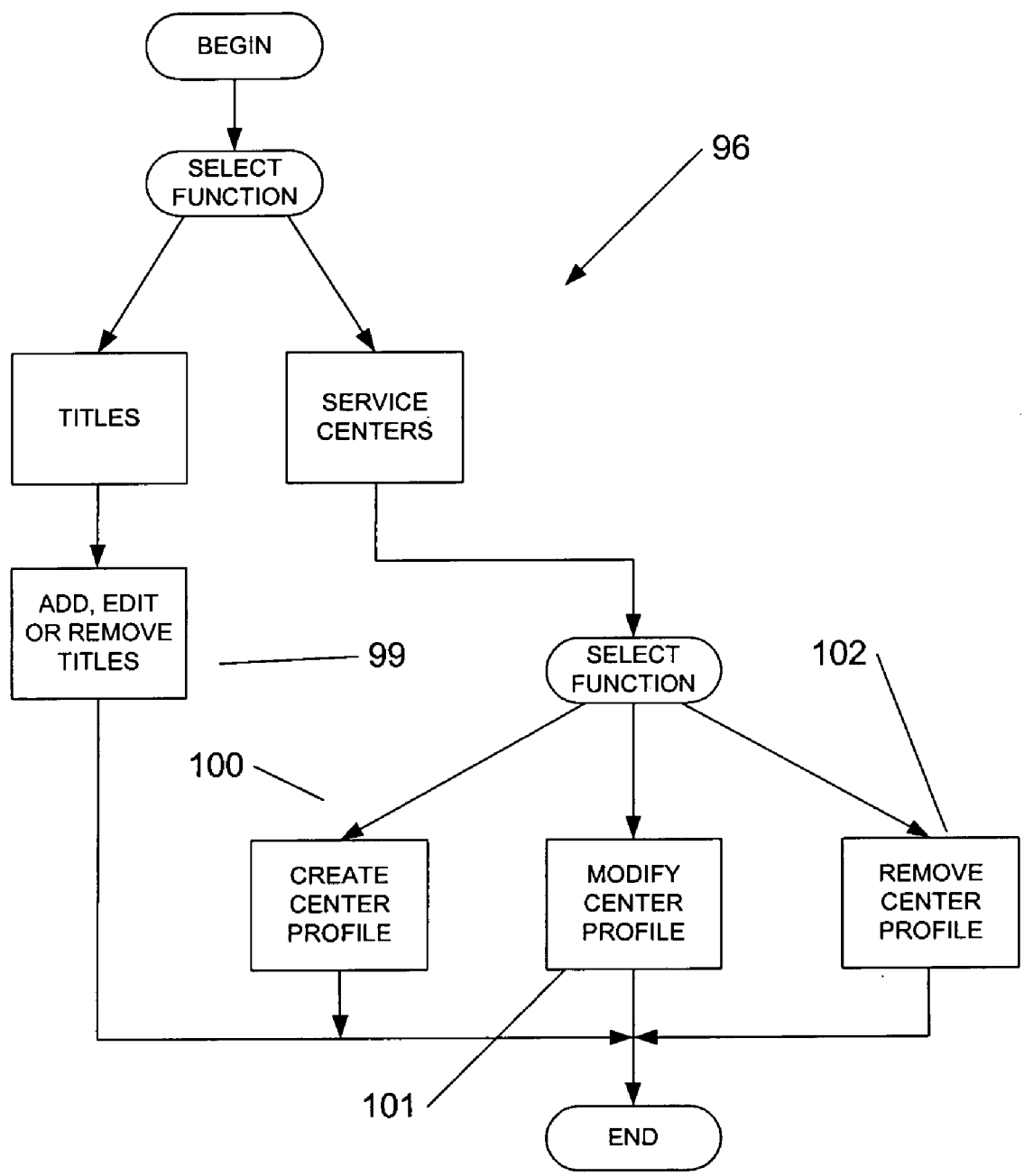
FIG. 12 shows, in flowchart, certain details of the title or profile maintenance step of the request approval function as detailed in FIG. 11.

As shown n FIG. 12, the company purchasing agent is the preferred level of control over the authorized titles list and the content of the service center profiles. The purchasing agent can add, edit or remove titles 99 and can create 100, modify 101 or remove 102 center profiles. Referring back to FIG. 5, however, it is noted that the database 74 is specifically set up to prevent such changes from having an adverse affect on pending orders. For example, it is noted that when a user selects a title 67 from the list of authorized titles, represented in the "titles" table 68, the actual title 67 is imported to the "users" table 64. In this manner, a single keystroke is prevented from upsetting the entire order process. On the other hand, some of the company data, but not necessarily all of the company data, is incorporated into the "users" table 64 by reference only. For example, the service center address 103 may find its way into an order through a reference only in the "users" table 64 indicating the location of the user. In this manner, a center relocation will be reflected upon every affected order not actually printed. Finally, in the event of a center closure during the pending of an order, the order will be rightly cancelled and the user individual user will preferably be required to select a new location upon next logon. As shown, in FIG. 13, the service center profile 104 includes much the same types of information as does an individual's profile, including address lines 105, billing codes 106 and/or logo designs 107.

Figure 14:
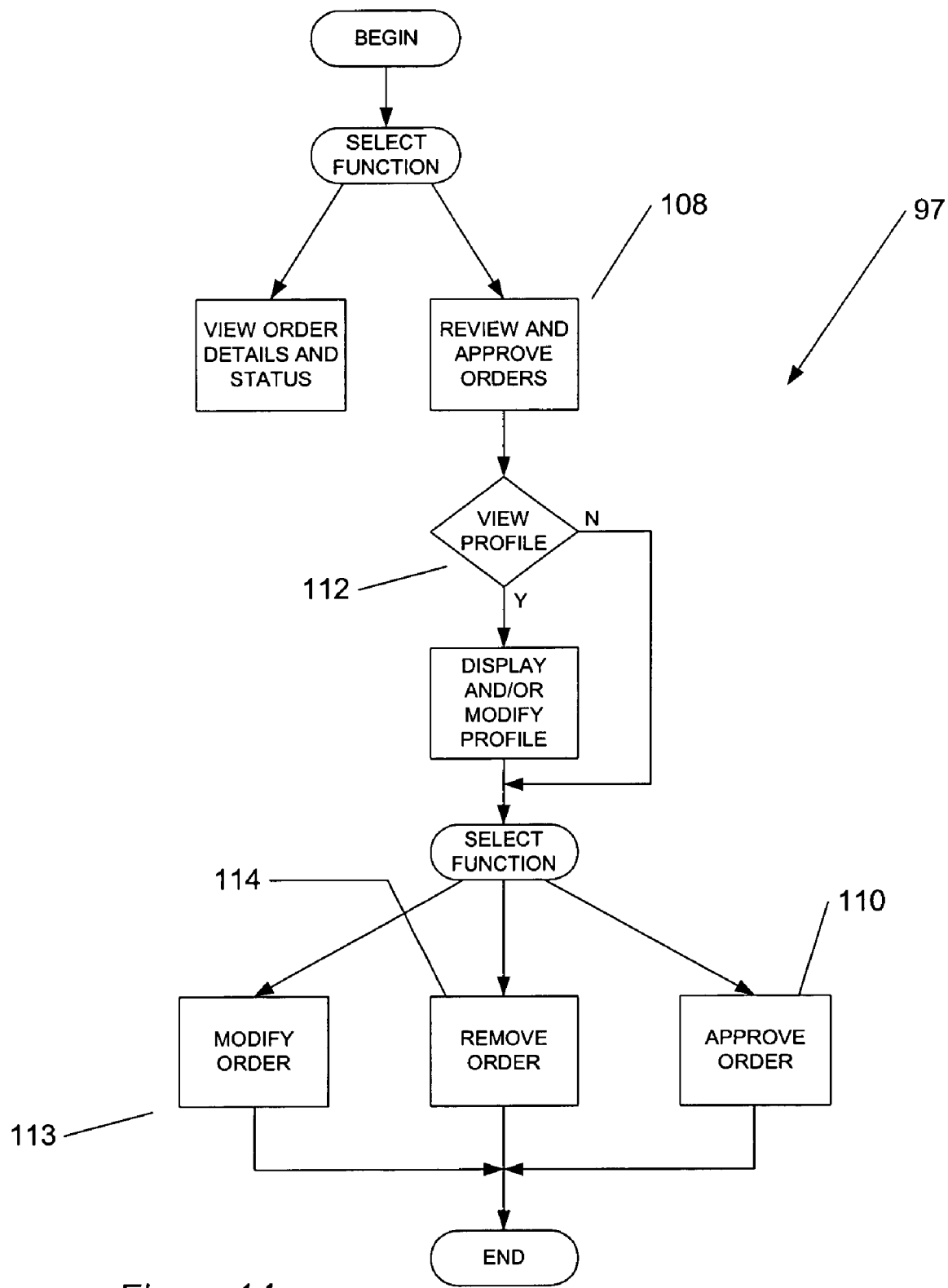
FIG. 14 shows, in flowchart, certain details of the order processing step of the request approval function as detailed in FIG. 11.
Figure 15:
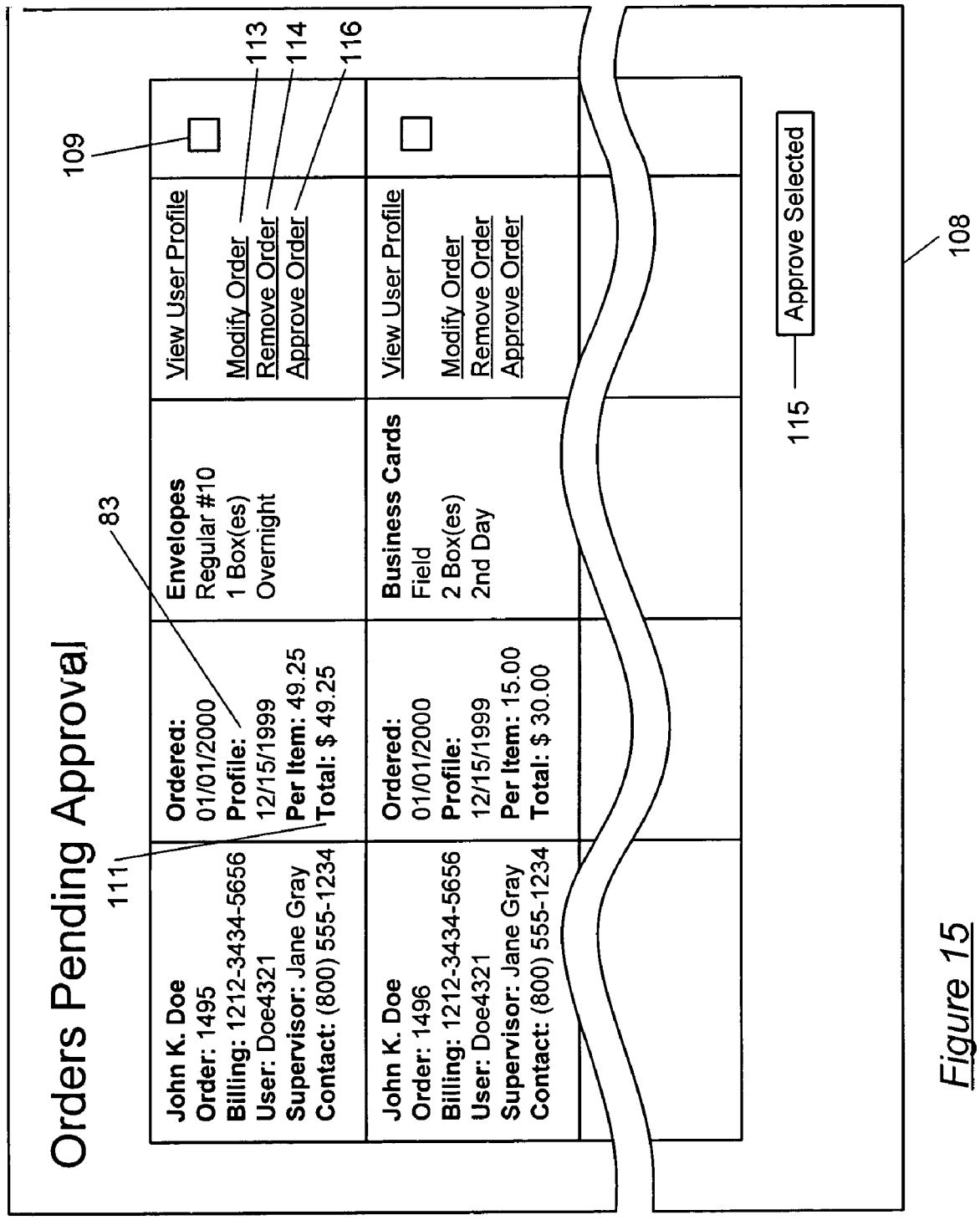
FIG. 15 shows, in a computer screen representation, certain details of the order approval sub-steps of the order processing step as detailed in FIG. 14.

Turning to FIG. 14, the order processing function 97 as made available to the purchasing agent is detailed. As shown, the streamlined process entails reviewing the orders 108 and then simply clicking a check box 109, shown in FIG. 15, to approve the orders 110. As previously mentioned, however, the purchasing agent does have information available indicating when the user last changed his or her profile 83 as well as cost information 111. This information may be used to invoke a decision to view the user's profile 112 for error prevention and/or to modify 113 or remove 114 an order or portion thereof. Once the purchasing agent has effect all necessary changes, however, and selected those orders for approval, a simple click of the "approve order" button 115 sets the actual printing process into motion. In the alternative, the preferred embodiment also comprises a function for the individual approval of a "rush" order without necessity for setting the entire process in motion 116.

Figure 16:
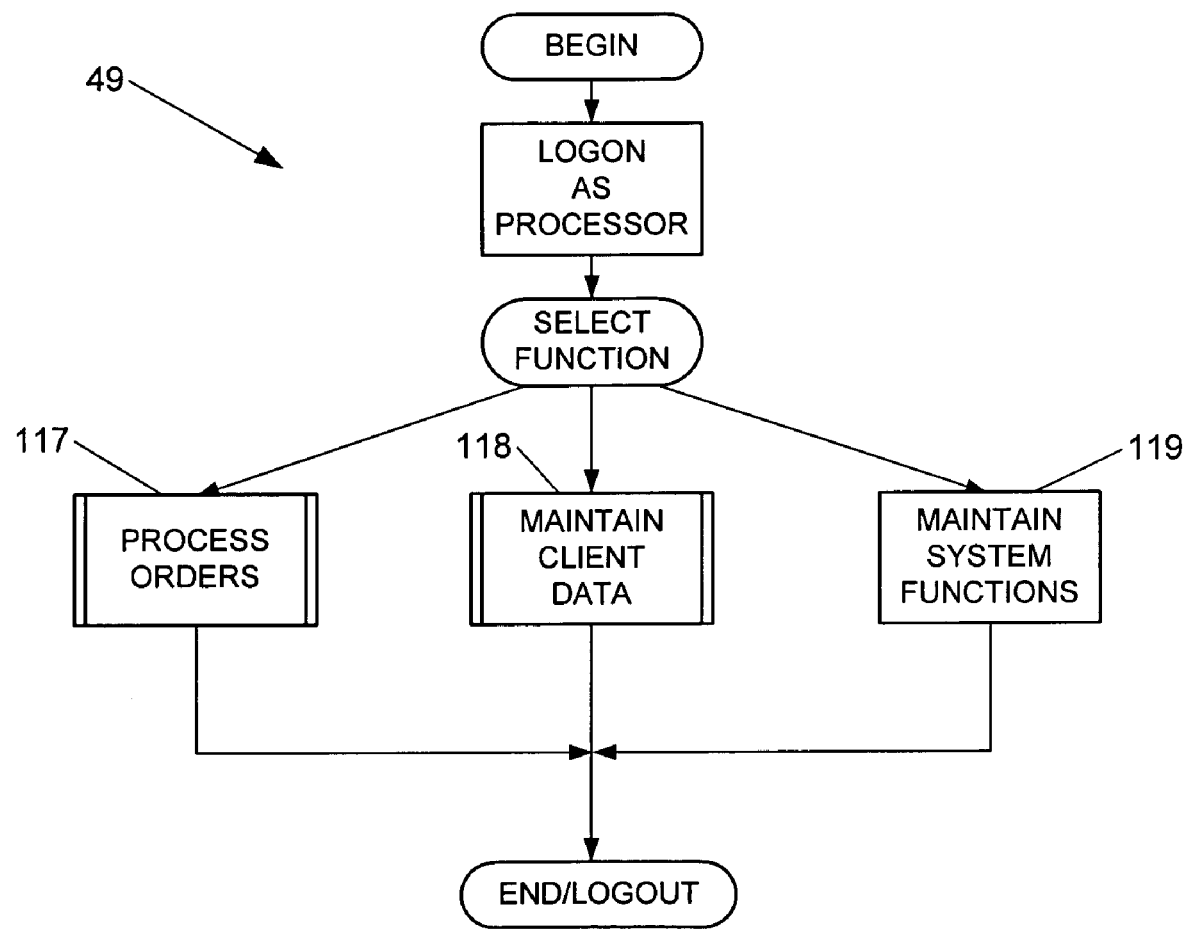
FIG. 16 shows, in flowchart, certain details of the batch processing function of FIG. 2.
Figure 17:
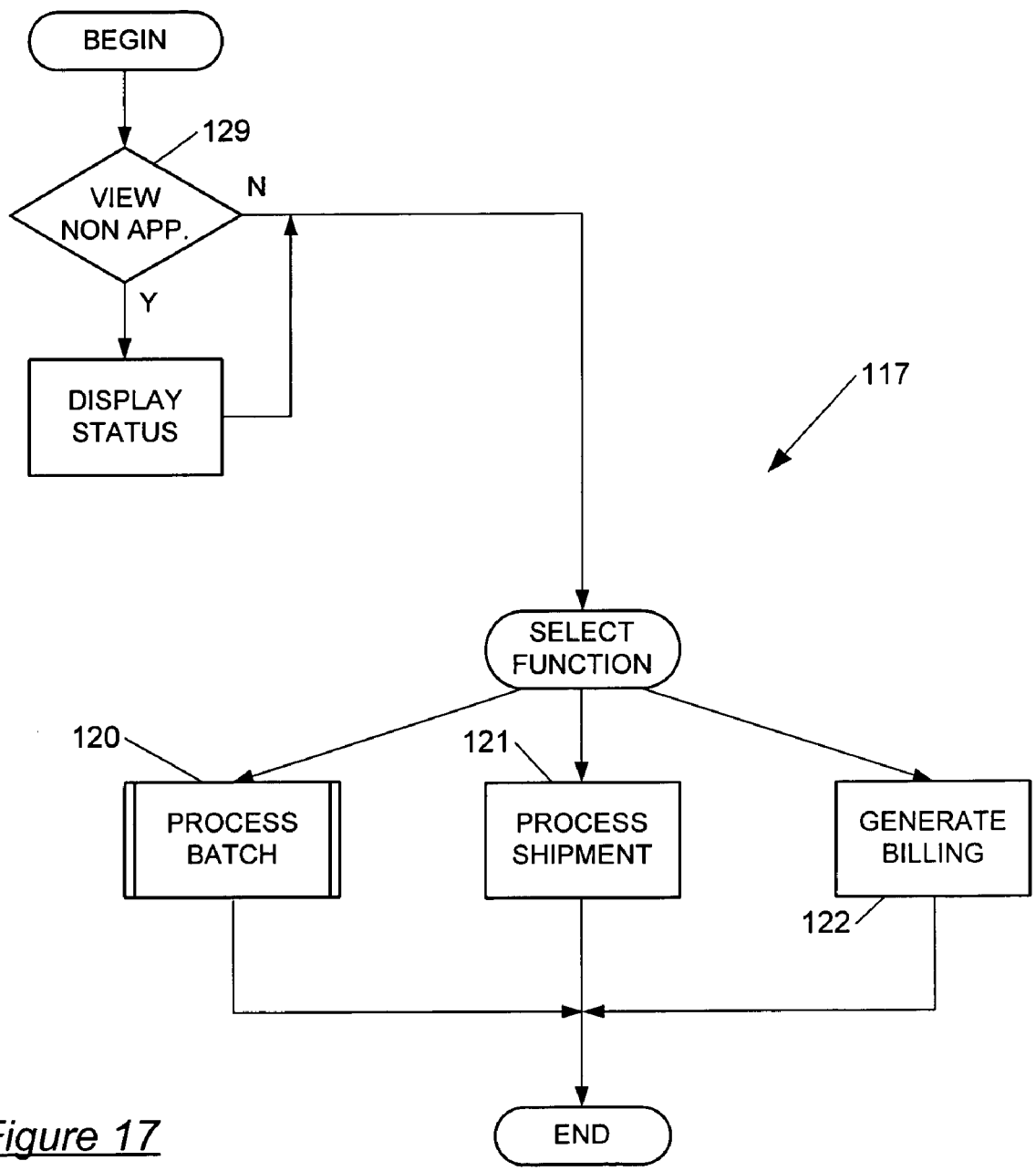
FIG. 17 shows, in flowchart, certain details of the order processing step of the batch processing function as detailed in FIG. 16.

Upon approval of one of more orders, the processor is provided with the ability to process the orders 117, as detailed in FIG. 16. As also detailed in FIG. 16, the processor also always has the ability to maintain client data 118, such as price lists, and to maintain system functions 119, such as field lists. As shown in FIG. 17, order processing 117 generally comprises the functions of batch processing 120, shipping 121 and billing 122. The processor is, of course, also given the ability to view the status of as of yet not approved orders 129, which is extremely useful to order raw materials according to statistical analysis indicating the number of orders that will materialize in the near future.

Figure 18:
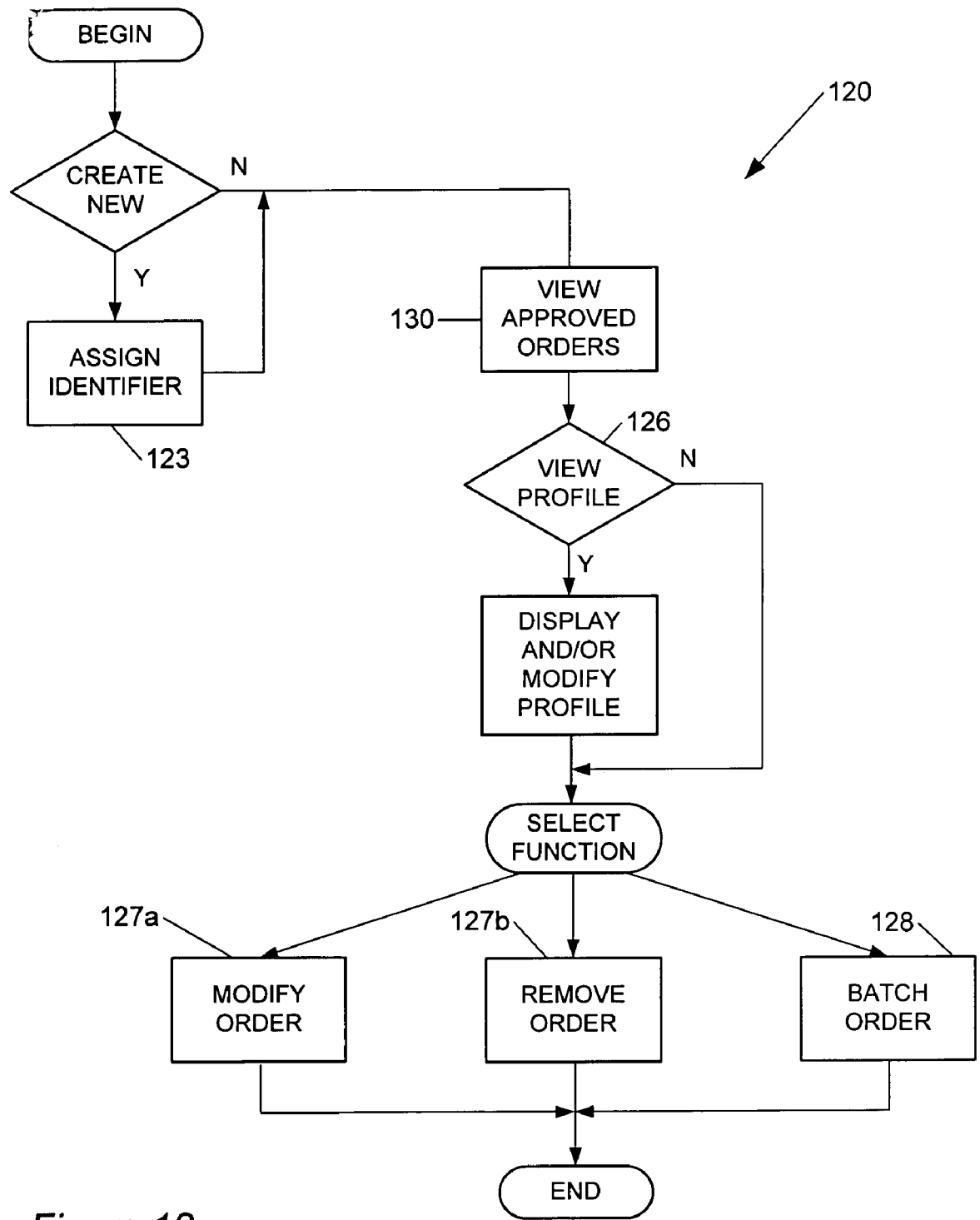
FIG. 18 shows, in flowchart, certain details of the batch creation and implementation sub-step of the order processing step as detailed in FIG. 17.
Figure 19:
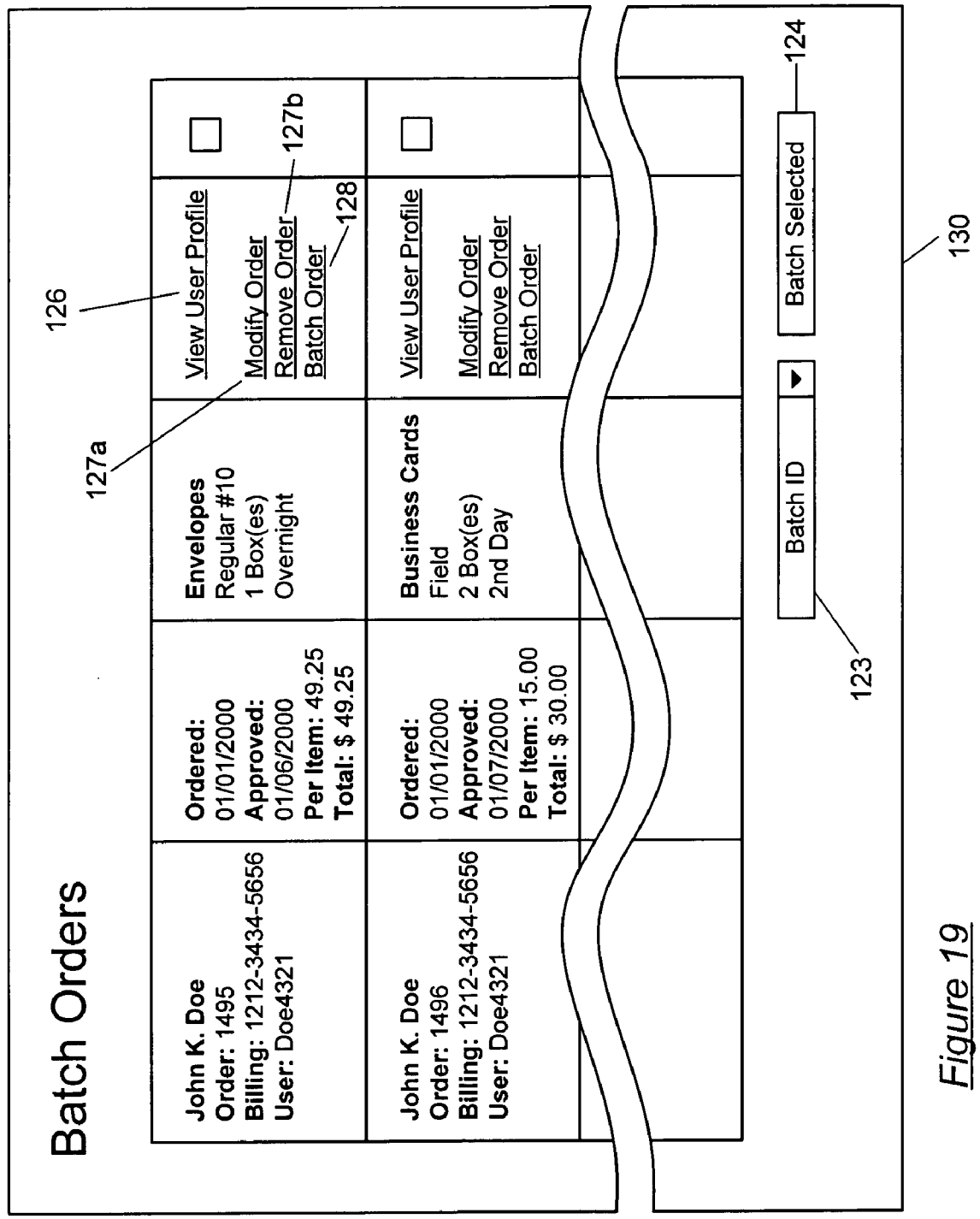
FIG. 19 shows, in a computer screen representation, certain details of the batch implementation sub-step detailed in FIG. 18.

Batch processing 120, detailed in FIGS. 18 and 19, allows the processor to sort out the orders into batches, each of which may be assigned a unique identifier for "work order" purposes 123, and to assign the sorted orders into appropriate batches 124, the assignment being recorded in a "batch element" table 125 as shown in FIG. 5. The assignment to batches will generally be based upon product style, paper stock requirements and ink color requirements, but also may consider such factors as shipping address. Although the process is presently a manual function, it is anticipated that the entire batching process could be implemented according to a rule-based system. This system would also ensure maximized profit without sacrifice to customer satisfaction by capping the length of time an order may be approved prior to printing while generally attempting to avoid unnecessary print runs. Finally, it is noted that the processor may view the approved orders 130, modify the orders 127*a*, and remove the orders 127*b*. The processor also preferably has access to the user profiles 126 during a manual batching 128 or an intervention to an automated batching, in order that any necessary correction can be made at any time prior to actual printing.

Figure 20:
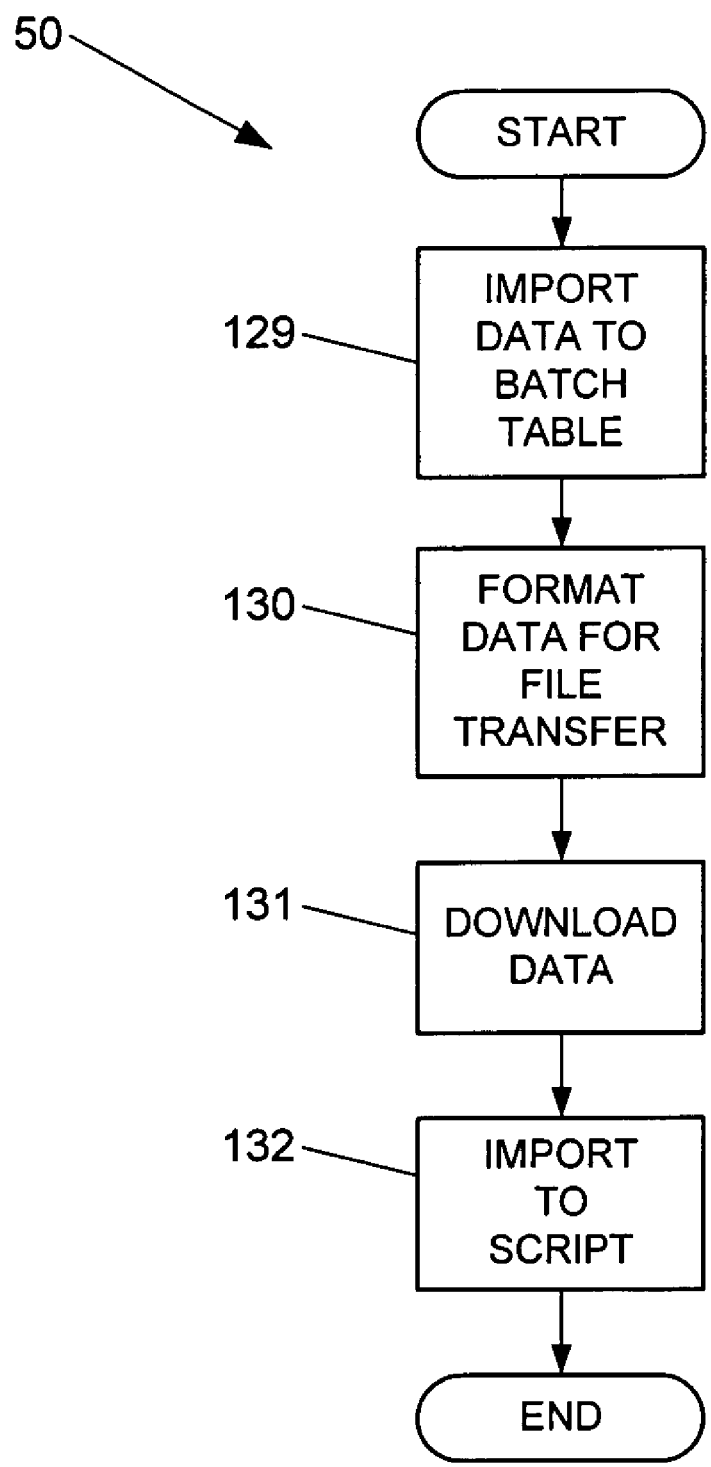
FIG. 20 shows, in flowchart, certain details of the batch-to-script importation function of FIG. 2.

Finally, as shown in FIG. 20, all information necessary for completing an order is flowed into a "batch" table 129 according to the order numbers identified in the "batch element" table 125 at a time just prior to order fulfillment. The data in the "batch" table 129 is then formatted for file transfer 130 and downloaded 131 for importing to the script program 132. In this manner, each predeterminable profile is automatically incorporated into the pre-press product with no typesetting or other human intervention. The pre-press product, which may be a direct-to-plate command set, high-speed copier command set or the like, is then taken to press.

In the system of the present invention, the time for order fulfillment is reduced from several days per plate to three to four minutes. What is more, the errors traditionally associated with business card and stationery product orders are essentially eliminated. It is to be expected, therefore, that the invention of the present invention will find widespread application in the fulfillment of business card and stationery product orders for virtually every institutional and conglomerate user.

While the foregoing description is exemplary of the preferred embodiment of the present invention, those of ordinary skill in the relevant arts will recognize the many variations, alterations, modifications, substitutions and the like as are readily possible, especially in light of this description, the accompanying drawings and claims drawn thereto. For example, it is anticipated that the entire initial database creation process could be automated through the provision of a software application specifically designed for this purpose. Likewise, with the implementation of an additional function involving an implementation of the trademark "ADOBE PDF" standard, the user requestor and/or purchasing agent could be given the opportunity to preview the finished product at the time of order entry or approval or, with an implementation involving a Macromedia trademark "FLASH" standard, user instructions could be verbalized and/or animated. In any case, because the scope of the present invention is much broader than any particular embodiment, the foregoing detailed description should not be construed as a limitation of the scope of the present invention, which is limited only by the claims appended hereto.

What is claimed is:

1. An automated print order system for business stationery products, said automated print order system comprising:
   at least one server computer configured to exchange data with a plurality of client computers;
   said server computer having a processor, an area of main memory for executing program code under the direction of the processor, a storage device for storing data and program code and a bus connecting the processor, main memory and the storage device;
   the code being stored in said storage device and executing in said main memory under the direction of said processor, to perform the steps of:
      defining a plurality of company-tailored prototypical product records wherein each prototypical product record comprises a template to define the placement and typography of a plurality of informational elements for printing on a company-tailored business card or stationery product and wherein the template comprises tracking, kerning, text adjustment, and graphics placement information;
      generating a list of fields associated with each prototypical product record wherein the list of fields is adapted to be filled with content defined by a plurality of company-tailored predeterminable profiles;
      implementing a database to collect and store data according to said field list;
      providing a requestor interface for entry of a distributed user's print order,
      operating said requester interface to present said user with selectable options including:
         an option to allow the user to select and order a company-tailored business card or stationery product to be printed according to the company-tailored prototypical product record and a predeterminable profile defining content for one or more of the informational elements provided by the template; and
      processing the user's print order through a processor interface, said processor interface being adapted to directly generate a pre-press product automatically incorporating said company-tailored predeterminable profile into said tailored product.

2. The automated print order system as recited in claim 1, wherein said pre-press product comprises a direct-to-plate command set.

3. The automated print order system as recited in claim 1, wherein the requestor interface further comprises an option to allow the user to select only those products for which company-tailored prototypical product records have been developed.

4. The automated print order system as recited in claim 1, further comprising user-indicative information including the user's name and title.

5. The automated print order system as recited in claim 4, wherein the user's title is pre-authorized title selected from a drop-down menu.

6. The automated print order system as recited in claim 1, further comprising an option to selectively authorize generation of said pre-press product.

7. The automated print order system as recited in claim 6, further comprising an option to modify said predeterminable profile.

8. The automated print order system as recited in claim 6, further comprising an option to modify the user's print order.

9. The automated print order system as recited in claim 6, further comprising an option to delete the user's print order.

10. The automated print order system as recited in claim 6, further comprising a batch function, said batch function being adapted to control the generation of said pre-press product.

11. The automated print order system as recited in claim 10, wherein said automated print order system is adapted to store the user's order in an order data table, said order data table comprising elements to reference one of said predeterminable profiles.

12. The automated print order system as recited in claim 11, wherein said batch function is further adapted to import information from one of said predeterminable profiles into a batch table according to said reference elements of said order data table, said batch table thereafter comprising a complete specification for said company-tailored business stationery product.

13. The automated print order system as recited in claim 12, wherein said batch function is further adapted to format said specification for said company-tailored business stationery product into a pre-press product compatible specification.

14. The automated print order system as recited in claim 13, wherein said company-tailored business stationery product comprises a business media selected from the group consisting of:
letterhead;
business card;
envelopes;
writing pads;
address cards;
and mailing labels.

15. The automated print order system as recited in claim 1, wherein said server is resident upon and is accessible from any operable node on the World Wide Web.

16. The automated print order system for stationery products, said automated print order system comprising:
at least one server computer configured to exchange data with a plurality of client computers;
said server computer having a processor, an area of main memory for executing program code under the direction of the processor, a storage device for storing data and program code and a bus connecting the processor, main memory and the storage device;
the code being stored in said storage device and executing in said main memory under the direction of said processor, to perform the steps of:
providing a set of printable stationery products;
customizing templates for a business organization to correspond with each stationery product in the set, wherein the template defines a plurality of common and specific informational elements for printing on the stationery product, wherein one of the common informational elements comprises a graphical representation of a business organization logo and wherein the template also defines the placement and typographical settings of the informational elements to be printed on the stationery product;
providing predefined informational content for the common informational elements of the customized templates, including for at least one of the common informational elements informational content that identifies a specific organization;
providing a requester interface for entry of a print order by a user associated with that organization, wherein said requester interface prevents the user from defining or modifying the organization-identifying informational content;
operating said requestor interface to present said user with selectable options including:
an option to select a stationery product from the set of printable stationery products,
an option to define or select a profile comprising informational content for the specific informational elements of the customized templates; and
in response to the print order, automatically generating a pre-press product incorporating both the predefined informational content for the common informational elements of the customized templates and the informational content from the user-defined or user-selected profile.

17. The automated print order system of claim 16, wherein one of the common informational elements comprises graphical representation of a business organization logo.

* * * * *